United States Patent [19]

Pearson

[11] 4,430,719

[45] Feb. 7, 1984

[54] CALCINATION CONTROL SYSTEM

[75] Inventor: Robert M. Pearson, Pleasanton, Calif.

[73] Assignee: Kaiser Aluminum & Chemical Corporation, Oakland, Calif.

[21] Appl. No.: 317,972

[22] Filed: Nov. 3, 1981

[51] Int. Cl.[3] .............................................. G01N 24/08

[52] U.S. Cl. .................................... 364/503; 364/172; 364/498; 364/500; 432/37

[58] Field of Search ............... 364/172, 498, 500, 503; 432/37

[56] References Cited

U.S. PATENT DOCUMENTS 3,075,756 1/1963 Gieskieng ........................ 364/503

3,483,363 12/1969 Ross .................................. 364/503

*Primary Examiner*—Jerry Smith

*Assistant Examiner*—Allen MacDonald

*Attorney, Agent, or Firm*—Andrew E. Barlay

[57] ABSTRACT

Nuclear magnetic resonance (nmr) is employed for the control of heat-input or feed rate of calcination and/or drying facilities. The residual volatile material content of the heat-treated material is monitored by nmr and the results obtained from the monitoring are employed to adjust the heat-input or feed rate to avoid overdrying or calcining of the heat-treated material. A computer, such as a micro-processor, may be utilized in combination with the nmr apparatus to provide instantaneous process control.

6 Claims, 1 Drawing Figure

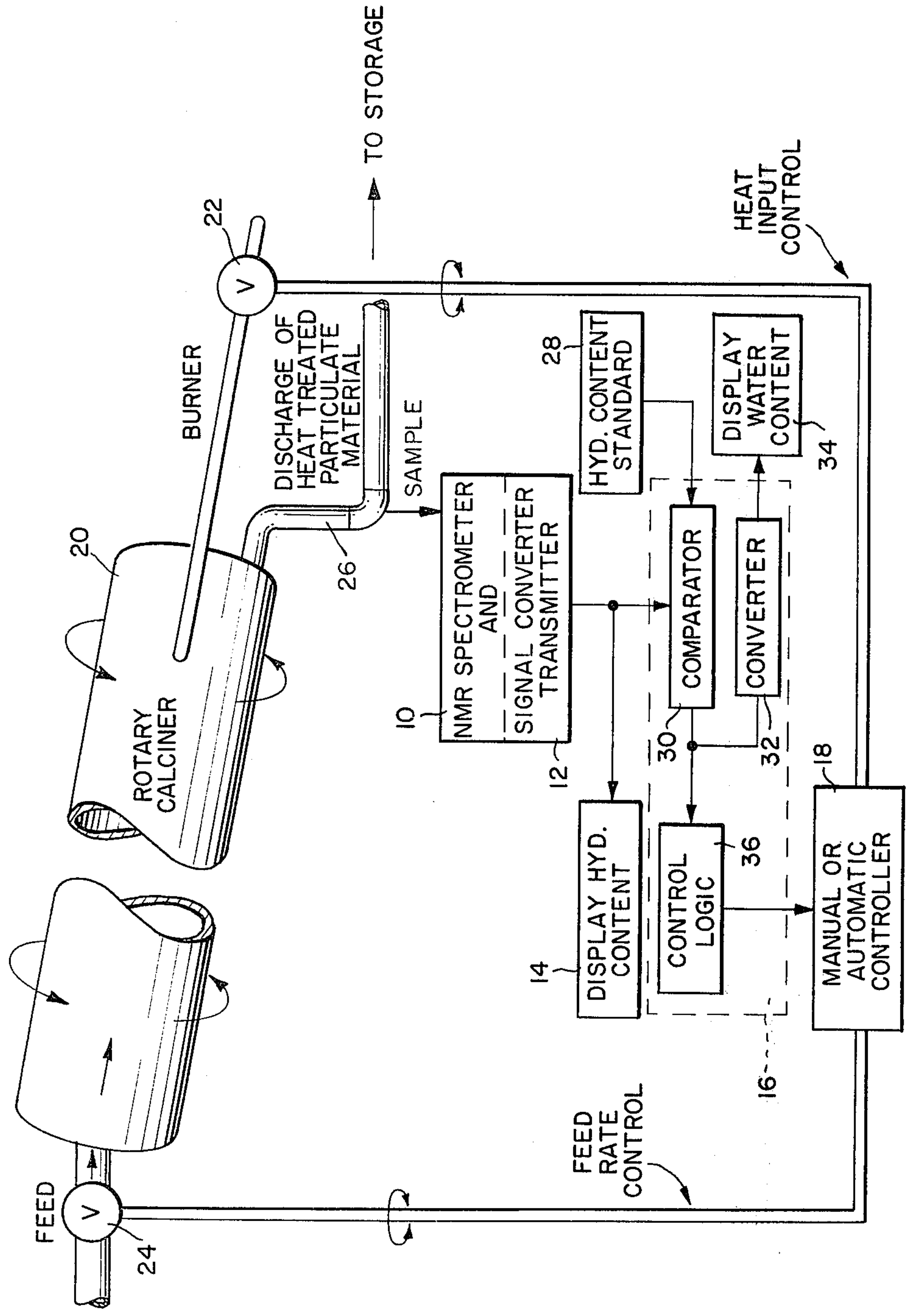
TO STORAGE
22
V
BURNER
20
ROTARY
CALCINER
DISCHARGE OF
HEAT TREATED
PARTICULATE
MATERIAL
26
SAMPLE
NMR SPECTROMETER
AND
SIGNAL CONVERTER
TRANSMITTER
10
12
HYD. CONTENT
STANDARD
28
DISPLAY
WATER
CONTENT
34
COMPARATOR
30
CONVERTER
32
DISPLAY HYD.
CONTENT
14
CONTROL
LOGIC
36
MANUAL OR
AUTOMATIC
CONTROLLER
18
16
HEAT
INPUT
CONTROL
FEED
RATE
CONTROL
FEED
V
24

CALCINATION CONTROL SYSTEM

BACKGROUND OF THE INVENTION

Thermal treatment of particulate materials, such as drying and/or calcining, is a wide-spread practice in many industries. Thermal treatment generally involves the application of heat to materials to remove their moisture or volatile content. For example, in the alumina industry for the preparation of reduction-grade alumina ($Al_2O_3$) or catalyst supports, alumina hydrate ($Al_2O_3.3H_2O$) is subjected to a thermal treatment to remove at least a portion of the water content of the alumina hydrate. Also, in the cement industry, the final commercial product is obtained from the raw cement by subjecting the raw cement to a calcination treatment. Volatile materials are removed by thermal treatment from many other products before they can be utilized. This applies, for example, to coke manufacture where the starting product, such as green coke, has to be freed of its volatile content by calcination before it can be commercially utilized in the aluminum or steel industry. In the manufacture of refractory products, removal of moisture or volatile matter is a common processing step. In many cases, including, but not limited to, the above examples, the volatiles released in the heating process include the hydrogen moiety of the sample. This permits one to monitor the calcination, or drying process, with a proton nuclear magnetic resonance spectrometer.

All of these operations require energy input and due to the high cost of energy, it becomes not only desirable, but also imperative, to minimize the waste of energy. One way to optimize the thermal treatment process is to introduce only the required quantity of heat energy in the equipment, such as rotary furnaces, coke ovens, fluidized bed furnaces, shaft kilns and the like. By the term "required quantity of energy", that quantity of energy is understood which produces the desired heat-treated product.

In the past, product quality control tests aimed to determine the residual moisture and/or volatile content of the heat-treated material involved the classical treatment of subjecting the heat-treated material to a further thermal treatment in the laboratory. This type of analytical procedure is time consuming and by the time the results are obtained, substantial quantities of energy can be wasted. To reduce the time involved in the testing, control system were suggested which continuously monitor the temperature within the heat-treating equipment. This type of control, although rapid and reliable with regard to temperature measurement, does not provide a true picture as far as the quality of the heat-treated product is concerned. As a result, operators tend to employ higher temperatures, e.g., use more energy, to assure that the heat-treated product meets the required standards.

A more current method, which, instead of measuring the furnace atmosphere, determines the properties of the heat-treated material, employs a neutron gun moisture probe. The neutron gun moisture probe utilizes fast neutrons from an americium source and directs these neutrons to a dried or calcined target sample. Hydrogen in the target samples slows down some of the fast neutrons causing back-scattering of these slowed down neutrons to a Geiger counter where they will be counted. The count can be correlated with volume percent hydrogen in the target sample and hence the residual combined water content can be calculated. The calculated results can then be used to adjust the heat-input to the heat-treating equipment as needed. This process, although rapid, lacks the desired sensitivity. In addition, if accurate results are desired, the sample size has to be significant, generally in the neighborhood of several hundred pounds, which renders the method cumbersome for plant process control purposes.

It has now been found that nuclear magnetic resonance (nmr) can be utilized to rapidly and reliably determine the residual moisture and/or proton-containing volatile content of heat-treated particulate materials and the results of such determinations can be immediately applied to adjust plant operating conditions resulting in optimization of operations and significant energy savings.

BRIEF SUMMARY OF THE INVENTION

A system is provided for controlling the heat-input into heat-treatment apparatus or the feed rate of particulate material charged into such apparatus by measurement of the residual hydrogen (proton) content of the heat-treated, particulate material discharged from the heat-treatment apparatus. The measurement of the residual proton content is accomplished by the use of a nuclear magnetic resonance (nmr) spectrometer. The nmr spectrometer produces a magnetic field and generator signals which are dependent upon and are proportional to the residual proton content of the heat-treated material. The signal is converted by a suitable means to direct readings of hydrogen content and the readings can be utilized for manual or computer controlled adjustment of the heat-input in the heat-treating process or of the feed rate of particulate material to the heat-treatment step.

BRIEF DESCRIPTION OF THE FIGURE

The foregoing objects, features and advantages of the present invention will be more clearly understood from a consideration of the following detailed description thereof, taken in conjunction with the single FIGURE, which schematically shows a system for monitoring the residual moisture content of a calcined alumina and associated means for rapid adjustment of the heat-input into a rotary calciner where the calcination of alumina hydrate takes place.

DETAILED DESCRIPTION OF THE INVENTION

This invention relates to a system for monitoring certain physical characteristics of particulate materials subjected to a thermal treatment and for controlling the extent of the thermal treatment based on data obtained from monitoring. More particularly, the system of the present invention involves the measurement of the hydrogen content of heat-treated materials by employing a nuclear magnetic resonance spectrometer and transmitting the obtained results to means capable of adjusting the thermal treatment conditions based on the measured results. The monitoring means for measuring hydrogen content consists of a nuclear magnetic resonance apparatus 10 combined with a signal converter transmitter 12 to provide direct readings, at a display 14, of hydrogen content as moisture content in percent by weight. The readings are transmitted to a microprocessor 16 which operates a controller 18 to provide any desired adjustment of the flame temperature in a calciner 20 by means of burner control valve 22, or of the feed rate of the calciner by means of a feeder valve 24.

For the purposes of the invention, the term "particulate material" refers to particles of varying particle size, for example, coarse and fine powders, granules, shaped or unshaped solids, and the like. The terms "heat-treatment" or "thermal treatment" as used herein refer to the application of heat-energy in a direct or indirect manner to the particulate materials for the purpose of removing the bound and/or unbound moisture content of such materials and/or the volatile matter content of the same. The expressions "nuclear magnetic resonance spectrometer" or "nmr spectrometer" refer to an apparatus which is capable of generating a magnetic field and to magnetize a magnetizable nuclear particle such as a proton.

The principle of nuclear magnetic resonance and the operation of nmr spectrometers is described in detail by Farrar and Beck in "Pulse and Fourier Transform nmr", Academic Press, New York, 1971.

There are basically two different types of nuclear magnetic resonance spectrometers. These are continuous wave spectrometers which hold either the magnetic field or the radio frequency (R.F.) constant and the other type, the pulsed spectrometers which use a strong radio frequency pulse of suitable frequency to obtain the resonance condition.

Continuous wave spectrometers produce spectra in the "frequency domain", the area of which, under suitable instrumental conditions, is proportional to the hydrogen content of the sample.

Pulsed spectrometers produce spectra in the "time domain"; the amplitude of which, under suitable instrumental conditions, is proportional to the hydrogen content of the sample.

The materials which can be monitored by the system of the invention include those which possess volatile proton moieties. When placed in an external magnetic field, the hydrogen nuclei, i.e., protons, behave as if they were a sphere in space spinning at a rate proportional to the strength of the external magnetic field. Since these nuclei are electrically charged, their rotation sets up a magnetic field along the axis of rotation. The "resonance" condition is achieved by irradiating the sample with an R.F. field of suitable frequency. Under these conditions, an electric current will be generated by the total magnetization of the sample and a signal is produced which the spectrometer measures and can, be suitable means, convert to direct readings, for example, to moisture content which is directly related to the hydrogen level of the sample.

In order to provide a clear understanding of the operation of the instant control system, its application to the measurement of bound and free water content of calcined alumina and the control of the calciner is going to be provided. It is to be understood, however, that the present invention has much wider scope of application and in no event shall the ensuing discussion of alumina calciner control be construed as a limitation.

For the electrolytic manufacture of aluminum metal, alumina ($Al_2O_3$) is generally employed as raw material. Alumina is electrolytically reduced to metallic aluminum in a molten bath and it is a requirement in the reduction operations that the calcined alumina utilized should have a minimal water content (bound and free) generally less than 1% by weight. The starting material for reduction-grade calcined alumina in most instances is a hydrated alumina ($Al_2O_3.3H_2O$) obtained from bauxite by the well-known Bayer process. The hydrated alumina, which usually contains free and bound water, is subjected to a thermal treatment, such as calcination, to render it suitable for reduction purposes. Calcination can be accomplished in conventional equipment, such as rotary kilns, fluidized bed furnaces or other suitable equipment, diagrammatically illustrated at 20. Heating of these calciners can be direct or indirect and generally the quantity of heat required to calcine hydrated alumina to the desired low water content ranges between 1700–2100 BTU/lb (944–1167 Kcal/kg). Other particulate materials, depending on their free and bound moisture content or volatile substance content, may require more or less heat-input. In any event, the energy usage is significant and clearly indicates the need for a monitoring and controlling system which not only assures product quality but also provides means to limit energy consumption to the required minimum quantity.

In the instant system, the monitoring of the calcined alumina quality is accomplished by taking samples of the calcined alumina at predetermined time intervals; for example, by way of calciner outlet 26. These intervals can be selected at ay desired frequency since the nmr spectrometer is capable of producing accurate and reproducible readings within a relatively short time, generally in less than 2 minutes after the alumina sample is placed in the sample container of the spectrometer. The rapidity of testing by the nmr spectrometer allows the use of the spectrometer for monitoring and controlling more than one heat-treating unit or furnace at one time. In the event more than one unit is being controlled by a single spectrometer, it is advisable to monitor the units in sequence.

The nmr spectrometer 10 utilized for testing the calcined alumina can operate either on the continuous wave technique or can employ pulses to transfer energy from the spectrometer to the sample. Both types of spectrometers can be readily obtained from commercial sources, and it is within the choice of the operator which type is utilized.

Measurement of the residual water content of calcined alumina in an nmr spectrometer 10 is accomplished by measuring the intensity of the signal generated by the hydrogen atoms in the alumina sample. The intensity measured by the spectrometer is directly related to the number of protons in the sample and thus directly to the residual water. The signal obtained from the sample is converted in converter 12 to a signal representing the residual hydrogen content of the sample, for display at 14. The output from converter 12 is compared to the signal generated by a standard of known water content. The results of the comparison can be obtained either by calculation or by employing a programmed computer 16 which receives the output from converter 12 and from a standard source 28 and compares these signals in a comparator 30. The programmed computer then translates the results in converter 32 to a direct reading of water content at display 34. The measured water content of the calcined alumina can be utilized for adjustments of the heat-input into the calcining unit. Thus, if the water content is below a desired minimum, then the heat-input is decreased; if the water content is too high, the heat-input is increased to obtain the desired product. These adjustments can be made either manually or by employing the programmed microprocessor 16, which, upon receipt of the results from the spectrometer, can issue commands by way of control logic 36 to controller 18 for the required adjustment.

It can be seen that the instant monitoring and control system allows on one hand the rapid and accurate measurement of the product quality and on the other hand, the immediate adjustment of the calcination system which results in significant energy savings apart from uniform product quality.

The following example is intended to provide details of the operation of the instant monitoring and control system.

EXAMPLE

Alumina hydrate ($Al_2O_3.3H_2O$) was continuously charged to a rotary calciner of about 300 feet (91.5 m) length where it was calcined to $Al_2O_3$ of from 0.4% to 3.3% residual combined water content by the introduction of natural gas which was combusted in the rotary furnace. The calcined alumina was recovered from the rotary kiln through suitable means, cooled, and sampled. These samples were subjected to testing for their residual water content in a Bruker Model No. P201 nuclear magnetic resonance spectrometer operating on the pulsed principle. The spectrometer operated at 4.69K gauss magnetic field and utilized 20 mHz pulses to excite the hydrogen atoms in the calcined alumina samples.

Portions of each sample were also used to determine the water content of the sample by classical methods involving heating of the sample in stages to 1000° C. and holding it at this temperature for one hour. The weight difference, or loss on ignition (LOI) was correlated with the water content obtained by the application of the nmr spectrometer.

The spectrometer was associated with means which converted the signals obtained to direct readings of moisture content which were directly related to the residual hydrogen content of the samples. These results can either be used for the manual adjustment of the feed rate of hydrate to the calciner or to reduce the gas flow to the calciner. In the event the readings are transmitted to a microprocessor, calibrated to issue commands if the readings differ from the preset required value, the microprocessor issues the necessary command either for adjustment of the feed rate or for the adjustment of the heat-input.

To indicate the accuracy of the instant monitoring system, a comparison of the water content obtained by the nmr spectrometer and by the classical ignition method is given in Table I.

TABLE I

COMPARISON OF WATER CONTENT OF CALCINED ALUMINA SAMPLES

| Sample | Water Content in Wt. % by LOI | Water Content in Wt. % by nmr |
|---|---|---|
| 1 | 0.4 | 0.4 |
| 2 | 1.0 | 1.0 |
| 3 | 1.8 | 2.2 |
| 4 | 0.6 | 0.6 |
| 5 | 1.3 | 1.4 |
| 6* | 3.5 | 4.1 |
| 7 | 2.1 | 2.2 |
| 8 | 3.3 | 3.3 |
| 9 | 3.3 | 3.3 |

*Sample contained physical water, an unusual condition which would require a different spectrometer calibration.

I claim:

1. A system for the control of residual proton content of heat-treated, hydrogen-containing particulate materials by adjusting the heat-input to the heat-treatment process or by varying the feed rate of the particulate material to the heat-treatment process which comprises a nuclear magnetic resonance (nmr) spectrometer means capable of measuring the proton content of the heat-treated particulate material by producing a magnetic field and thus generating a signal proportional to the residual proton content of the heat-treated particulate material; means to convert the generated signal to readable measured units corresponding to the residual hydrogen content of the heat-treated particulate material, means for comparing the measured units to preset units of desired hydrogen content, and associated control means for issuing commands to the heat-treatment process for the adjustment of the heat-input or the particulate material feed rate.

2. System according to claim 1, wherein the nmr means is a continuous wave spectrometer.

3. System according to claim 1, wherein the nmr means is a pulsed wave spectrometer.

4. System according to claim 1, wherein said means to convert the generated signal to readable units of hydrogen content is an integral part of the nmr means.

5. System according to claim 1, wherein the control means is a computer means.

6. System according to claim 1, wherein the control means is manual means.

* * * * *